Dec. 19, 1944. J. OPIE Re. 22,581

SHEARING AND PUNCHING MACHINE

Original Filed Dec. 18, 1942 3 Sheets-Sheet 1

Inventor:
John Opie.
by Fred Gerlach
Attorney.

Dec. 19, 1944. J. OPIE Re. 22,581

SHEARING AND PUNCHING MACHINE

Original Filed Dec. 18, 1942 3 Sheets-Sheet 2

Inventor
John Opie
by Fred Gellock
Attorney

Dec. 19, 1944. J. OPIE Re. 22,581

SHEARING AND PUNCHING MACHINE

Original Filed Dec. 18, 1942 3 Sheets-Sheet 3

Inventor:
John Opie:
by Fred Gerlach
Attorney.

Reissued Dec. 19, 1944

Re. 22,581

UNITED STATES PATENT OFFICE 22,581

SHEARING AND PUNCHING MACHINE

John Opie, Riverside, Ill., assignor to Whiting Corporation, Harvey, Ill., a corporation of Illinois Original No. 2,343,697, dated March 7, 1944, Serial No. 469,739, December 18, 1942. Application for reissue September 7, 1944, Serial No. 552,961

27 Claims. (Cl. 164—86)

The present invention relates generally to machines for use in shearing, nibbling and punching sheet metal or the like. More particularly the invention relates to that type of shearing, nibbling and punching machine which comprises as its principal parts or components a C-shaped frame, a head on the outer end of the upper arm of the frame, a horizontal power driven shaft extending through and journalled in the head, a depending connecting rod having its upper end connected to the shaft by crank means, and a vertically slidable plunger type ram disposed beneath the connecting rod, having its upper end operatively connected to the lower end of the rod and provided at its lower end with tool holding means.

One object of the invention is to provide a shearing, nibbling and punching machine of this type which is an improvement upon, and eliminates the defects of, previously designed machines and is characterized by high efficiency, low cost of manufacture and facility of adjustment.

Another object of the invention is to provide a machine of the type under consideration in which the head on the frame embodies a pair of spaced apart side parts with horizontally aligned apertures therein and the horizontal power driven shaft is supported by way of a pair of circular members which are mounted rotatably in the apertures, respectively, have horizontally aligned eccentrically disposed bearings therein for the shaft and are adapted when conjointly rotated to change the horizontal position of the shaft.

Another object of the invention is to provide a shearing, nibbling and punching machine of the aforementioned type in which the crank means between the connecting rod and the horizontal power driven shaft consists of inner and outer coacting relatively rotatively adjustable circular members which when rotated one relatively to the other effect a variation in the magnitude of the stroke of the connecting rod.

Another object of the invention is to provide in connection with a shearing, nibbling and punching machine of the type and character under consideration a novel and improved bearing for the vertically slidable plunger type ram and in addition a new variety of stripper for the work.

A further object of the invention is to provide a machine of the aforementioned type in which the ram and connecting rod are connected by a spring loaded driving connection which is arranged and designed so that the ram is positively slid downwards during the down stroke of the connecting rod and is slid upwards with a yielding thrust during up stroke of the connecting rod.

A still further object of the invention is to provide a shearing, nibbling and punching machine which is generally of new and improved construction and effectively and efficiently fulfills its intended purpose.

Other objects of my invention will be apparent from a consideration of the following detailed description.

Figures 4, 5, 6:
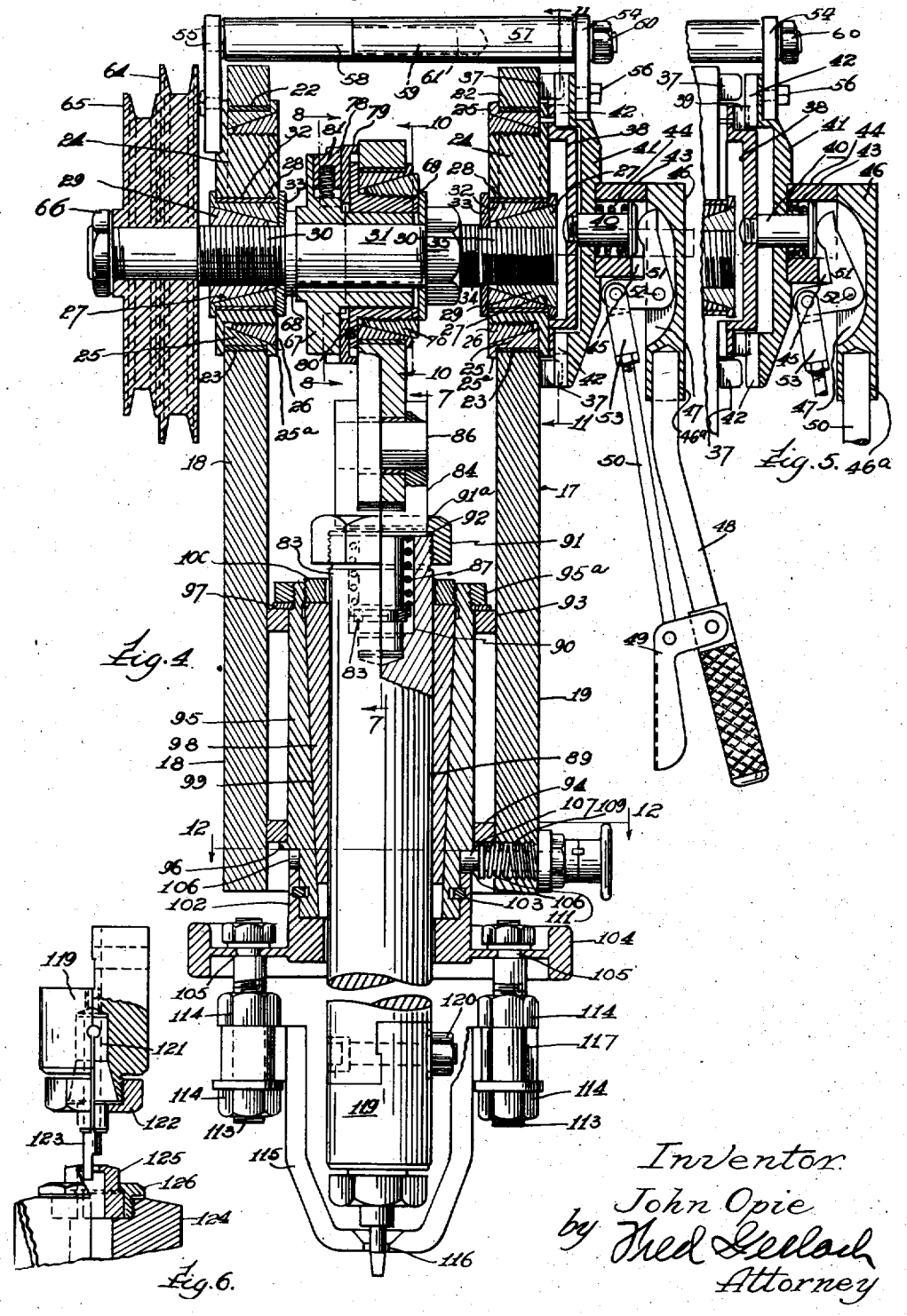
Figure 4 is a vertical section of the head and associated parts, taken on the line 4—4 of Figure 1.
Figure 5 is a detailed sectional view of the releasable clutch means for selectively rotating the cam bearings, showing same in open or operating position for raising or lowering the main drive shaft.
Figure 6 is an enlarged sectional view of the tool holding member and the lower die.
Figure 12:
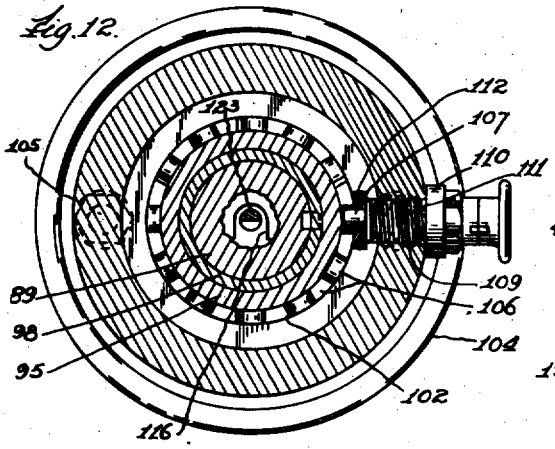
Figure 11:
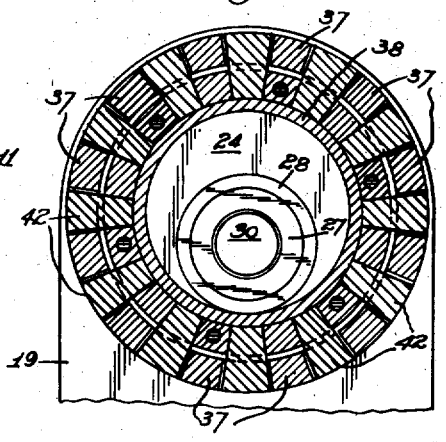

Figure 11 is a detailed cross-sectional view taken on the line 11—11 of Figure 4 and illustrating parts of the releasable clutch mechanism by means of which the position of the shaft-supporting cam bearings are positioned; and Figure 12 is a detailed sectional view taken on the line 12—12 of Figure 4 and showing the interior parts of the releasable and retractable locking means of the rotatable hand wheel within which the reciprocable ram is slidably mounted.

Figure 1:
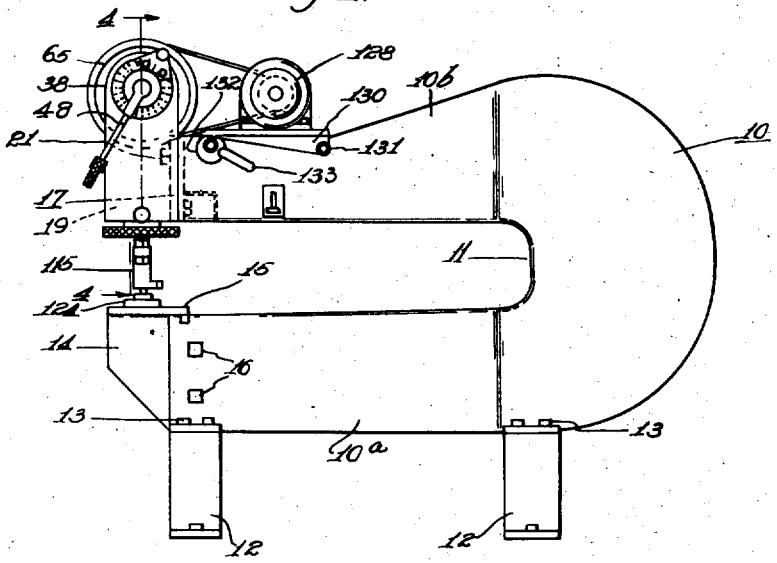
Figure 1 is a side elevation of a punching, nibbling and shearing machine embodying my invention.
Figure 2:
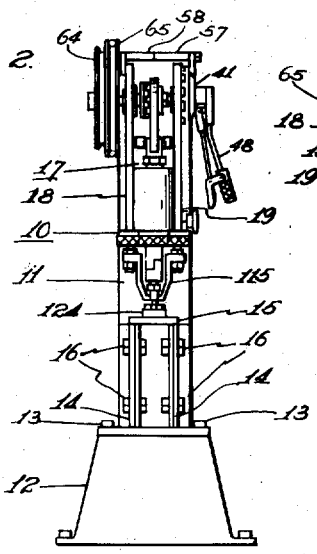
Figure 2 is a front elevation of said machine.
Figure 3:
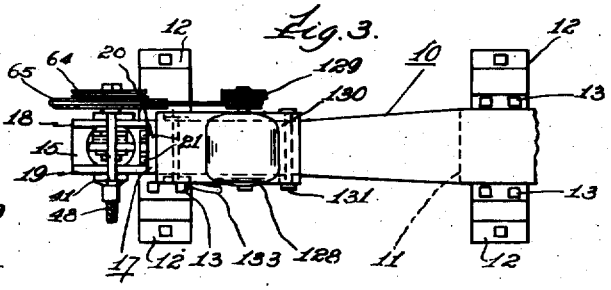
Figure 3 is a top plan view of a portion thereof showing the shaft driving motor mounted in position.

Referring to Figures 1 to 3, inclusive, reference numeral 10 designates a substantially C-shaped metal frame which substantially defines a relatively long horizontally extending throat 11 which is of adequate length to permit varied movements of metal sheets of substantial size in the cutting operations performed with the aid of the improved machine. Said frame 10 may be composed of a plurality of suitably formed metal blanks which are welded together at their adjoining edges, or said frame may be cast or otherwise assembled.

Numerals 12 designate a pair of spaced apart metal bases which have suitable apertured integral flanges along their respective lateral edges to provide for securing said bases to the floor or other supporting surface by means of bolts or the like as illustrated in Figures 1 and 3. Frame 10 is secured to and upon the upper flat top portions of bases 12 by suitably spaced bolts or screws 13 which pass through suitable apertures (not shown) in the lower portion of said frame and into the upper parts respectively of said bases.

On the forward end of the lower arm 10*a* of frame 10, shown at the left of Figure 1, either by suitable bolts 16 or by welding, are secured a pair of relatively strong vertically extending metal brackets 14, each of which, as illustrated in Figure 2, is composed of two secured-together metal bracket plates. A horizontally extending metal shelf or base 15 is secured on the upper ends respectively of the brackets 14 and in position slightly higher than the upper surface of the lower frame arm 10—*a*, as illustrated in Figure 1. A portion of said shelf or base 15 preferably extends over and lies upon the foremost or forward portion of the frame arm 10—*a*, and has an angularly bent end (shown in dotted lines in Figure 1) engaging a suitable aperture in said frame arm 10—*a*. Said supporting shelf or base 15 is adapted to have mounted thereon one portion of a die, usually the passaged female portion. The mounting shelf or base 15 is also centrally apertured (though such aperture is not shown) so that in punching out operations, the punched out or otherwise severed parts of the sheet being worked upon may fall downward through the space between the spaced brackets 14.

A metal mounting frame 17 of U-shaped cross section is composed of substantially flat vertically extending side members or standards 18 and 19, which are connected together at the lower portions of their inner margins by an apertured integral connecting member 20. The side members 18 and 19 of the mounting frame 17 extend substantially above the connecting member 20 and above the upper face of the upper frame arm 10—*b*, and have relatively large correspondingly positioned apertures 22 in their upper ends respectively which are adapted to receive cam or eccentric type bearing means which are hereinafter more fully described. Said mounting frame may be securely mounted to the end face of the frame arm 10—*b* by a plurality of screws or bolts 21, one of which is shown in dotted lines in Figure 1.

As illustrated in Figure 4, two metal bushings 23 are mounted respectively in the apertures 22 of the two vertically extending frame side members 18 and 19. Within said bushings are mounted eccentrically apertured rotatably adjustable cam bearings 24, each of which is surrounded by an outer annular bushing 25 having an outwardly extending annular flange 25*a* and a tapered inner periphery and a complemental internally threaded rotatively adjustable inner bushing 26 which has a reversely tapered outer periphery engaging the tapered inner periphery of the outer annular bushing 25. As stated, 24 designates the eccentrically apertured cam bearings, and said bearings are externally threaded as indicated and are secured in position by the inner bushings 26 which thread thereon. The outer ends of the cam bearings 24 are provided with outwardly extending flanges and these are disposed in opposed relation with the outwardly extending annular flanges 25*a* of the bushings 25 and coact therewith to hold the bearings 24 against axial displacement with respect to the apertures 22 while at the same time permitting the bearings to rotate within said apertures.

The cam bearings 24 have mounted in their non-axial or eccentrically positioned apertures suitable journalling bearings 27, each of which is composed of an outer bushing 28 with a tapered inner periphery and an inner internally threaded complemental bushing 29 with a reversely tapered outer periphery. The inner bushings 29 are threaded upon a pair of right hand screw threads 30 on a rotatable shaft 31, said threads 30 being spaced apart substantially as indicated in Figure 4. Between the bushings 28 and the eccentric or cam bearing members 24 are interposed suitable metal annular linings or sleeves 32.

In mounting the shaft and the aforedescribed parts, the outer bushings 28 are inserted from the outside and within the sleeves 32, whereupon the inner bushings 29 are threaded upon the threads 30 of the shaft 31 until a snug and non-sliding engagement is effected between the tapered outer peripheries of the inner bushings 29 and the reversely tapered inner peripheries of the outer bushings 28. Two washers 33 are first mounted on the shaft 31 before mounting of the bushings 28 and 29 aforesaid. Said washers 33 are secured as indicated in Figure 4 against the inner ends of the bushings 28 and the sleeves 32. It will be understood from the foregoing that when the shaft 31 is rotated as will be hereinafter described, the bushings 28 and 29 rotate therewith and there is sliding engagement of the outer peripheries of the outer bushings 28 and the inner peripheries of the linings or sleeves 32.

The shaft 31 is so formed that one of the threaded areas 30 is formed upon an end portion of the shaft 31 that is slightly reduced in diameter from the intermediate portion of said shaft. As shown in Figure 4, the intermediate portion of said shaft 31 has a threaded section designated as 34 in Figure 4, on which is threaded a lock nut 35. The latter normally secures cooperating cam elements hereinafter described in desired relative positions, said lock nut being releasable by unthreading movement in order to permit a change in the relative position of the cooperating cam elements which control the length of stroke of the ram and connected parts as hereinafter described.

Referring to the cam bearings 24 which are held against axial displacement by their outwardly extending flanges and the outer flange equipped bushings 25, I desire it to be understood that said bearings 24 may be rotatively adjusted to various angular positions in order to lower or raise the ram and associated parts.

A further accomplishment of my invention is the provision of easily operable means and mechanism for adjusting the cam bearings 24 by rotation thereof to the desired position. As shown at the upper right hand portion of Figure 4, the right hand side member or standard 19 of the frame 17 has secured about its upper opening or aperture 22 a ring gear or toothed or serrated ring 37 which is concentric to said aperture, and whose teeth extend sidewise or in general horizontal direction. Mounted within said serrated ring 37 is a mounting plate 38 whose peripheral edge is bent angularly as indicated in Figure 4 and which mounting plate 38 is suitably secured by rivets, welding or the like, to the other end face of the right hand eccentrically apertured cam bearing 24. Said mounting plate 38 has a plurality of horizontally extending integral equally spaced peripheral teeth 39 which are shown particularly in Figure 5.

Said mounting plate 38 has a central aperture therein in which is threaded the inner threaded end of a stud bolt 40, which has its outer end headed or flanged as indicated in Figures 4 and 5.

An annular clutch plate 41 which has laterally extending integral teeth 42 on its periphery, and which is centrally apertured, is journalled on stud bolt 40, said stud bolt passing through the central aperture of said clutch plate as illustrated. Interposed between the headed portion of said stud bolt and the central area of said clutch plate 41 is a compression spring 43 as illustrated in Figures 4 and 5, said spring normally exerting its expansive pressure against the clutch plate 41 to interlock or mesh the clutch plate teeth 42 and the correspondingly spaced teeth 39 which are on the outer peripheral surface of the mounting plate 38.

Secured upon the central area of the slidably mounted clutch plate 41 is a relatively short sleeve 44 which has a side opening or recess 45 therein as indicated and whose internal longitudinal bore is sufficient to provide for sliding of said sleeve 44 along the periphery of the head of the stud bolt 40.

Fixedly secured by welding or the like upon the outer end of the sleeve 44 is a metal handle-mounting plate 46 which has a radial slot 47 adjacent the recess 45, said handle mounting member 46 being provided with a radial socket-equipped extension 46—*a*. Secured by welding or suitable means in the socket of the extension 46—*a* of the mounting plate 46 is a suitable metal lever-type handle 48, which is preferably bent slightly outwardly as indicated in Figure 4, and which handle 48 has pivoted near its outer end an L-shaped arm 49, as illustrated in Figure 4. The arm 49 has a suitable transverse aperture formed in its intermediate portion, and a metal connecting link 50 has one end thereof pivotally connected to the intermediate portion of the arm 49 by a suitable rivet or the like which extends through said transverse aperture.

Referring to the upper right hand portion of Figure 4, numeral 51 designates a substantially L-shaped lever or pawl whose central portion is apertured and is pivotally mounted upon a pin, rivet or the like 52 which passes through the mounting member 46 in a general transverse direction, and which connection thereby pivotally mounts said pawl 51 substantially in the slot 47. The transversely or horizontally extending portion of pawl 51, and which is indicated in Figure 4 as extending to the left, is apertured and is pivotally connected to the other end of the link 50 by a link member 53 whose one end portion is preferably threaded and adjustably and threadingly engages said other end of the link 50. A lock nut is illustrated in Figure 4 and serves to lock the link member 53 in place after it has been turned to the desired extent relatively to the link 50. Swinging of the handle 48 after release of the clutch plate 41 through the medium of the pawl serves rotatively to adjust the bearings 24.

In order that both of the cam bearings 24 will be rotated simultaneously and to the same extent in either direction, I provide a suitable connection between said bearings so that both thereof will always be moved to the same degree and maintained in alignment. This connection, illustrated in my preferred form in Figure 4, comprises a pair of radially extending metal arms 54 and 55 which are correspondingly apertured at their outer ends and spaced laterally or transversely apart. The arm 54 has its inner end secured by a bolt 56 to the peripheral portion of the toothed clutch plate 41. The other arm, i. e., the arm 55, has its inner end bolted or otherwise fixedly secured to the left hand cam bearing 24. An elongated longitudinally passaged metal member 57 has one reduced end thereof secured in the aperture at the other end of the arm 54 by a nut 60 so as to mount said member 57 perpendicularly to said arm 54. The other end of the member 57 has a longitudinal passage in which a pin 58 is slidably mounted. The pin 58 has a reduced end 59 and is secured perpendicularly to the arm 55 in any suitable manner, as for example, by a reduced threaded end portion which extends through the aperture in the outer end of the arm 55. Longitudinal passage of member 57 is designated by numeral 61, and is of a size to form a slidable fit with reduced end portion 59 of the pin 58.

It will be apparent that when the slidably mounted clutch plate is moved in an outward direction to disengage the clutch plate teeth 42 from locking engagement with the teeth of the ring 37, such outward movement will move the outer arm 54 and member 57 to thereby partially separate member 57 and pin 58, and that when the handle 48 and connected parts are partially rotated the rotative movement imparted to the clutch plate 41 and the right hand cam bearing will be correspondingly transmitted through arm 54, member 57, pin 58 and arm 55 to the left hand cam bearing 24 so that the latter will be moved a corresponding degree in the step of adjusting the height of the hereinafter described ram with respect to the frame of the machine and with respect to the work. When the clutch plate 41 is shifted outwards so as to permit of rotative adjustment of the cam bearings 24 by swinging of the handle 48 the teeth 42 of the clutch plate remain in interfitting relation with the teeth 39 of the mounting plate 38 and hence in connection with turning of the clutch plate by the handle there is corresponding turning of the right hand cam bearing 24. When, after a cam bearing adjusting operation, the L-shaped arm 49 is released the compression spring 43 shifts inwards the clutch plate 41 and causes the teeth 42 thereof so to interfit with the teeth of the ring 37 as to lock the cam bearings in their adjusted position.

Reference numerals 64 and 65 designate grooved pulleys of different relative sizes which are secured upon the projecting end of the shaft 31 by means of a nut 66 threaded on said end of the shaft. Said pulleys are adapted selectively to receive and to be driven by a suitable V belt from the power source hereinafter described.

As shown in cross section in Figure 4, the machine comprises a depending connecting rod 72 between the shaft 31 and the ram or plunger and also comprises an adjustable connection means which forms a crank for reciprocating the rod and ram or plunger in response to drive of the shaft. Such adjustable connection means comprises two cooperating interfitting eccentric cam members, one being rotatable with relation to the other so as to provide adjustable and changeable variations of the stroke imparted to the ram or plunger and tools secured thereon through the medium of the connecting rod 72.

Referring to Figure 4, reference numeral 67 designates a bushing-like metal cam member whose contral portion is keyed or otherwise securely mounted upon the shaft 31 and locked between a washer 68 on the shaft 31 and the lock nut 35. The external cylindrical surface of the inner end portion of the cam member 67 is eccentric to the axis of the shaft 31. A bushing-like cam member 69 having an eccentric cylindrical inner periphery is rotatably mounted or journalled upon the eccentric cylindrical outer periphery of the inner end portion of the cam member 67. Said cam member 69 has an integral radially extending flange as indicated in Figure 4, and its exterior surface or periphery is threaded as shown. A cone-shaped nut 70 is releasably threaded upon the exterior threaded surface of the cam member 69, as shown in Figure 4.

Figure 8:
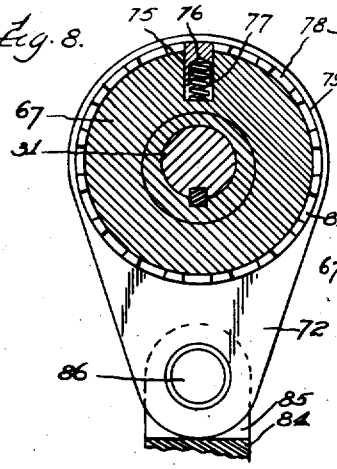
Figure 8 is a detailed cross-sectional view taken on the line 8—8 of Figure 4 and showing the manually adjustable and manually releasable locking means for the cooperating adjusting cams which regulate the length or stroke of the ram.
Figure 9:
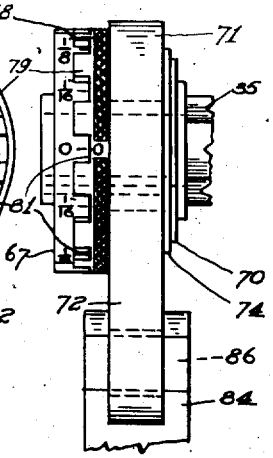
Figure 9 is an enlarged elevational view looking at the right hand side of Figure 8.
Figure 10:
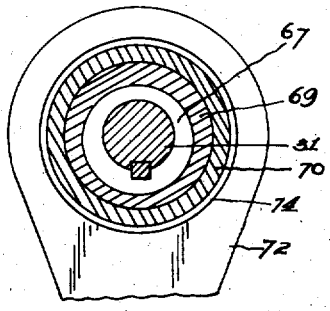
Figure 10 is an enlarged detailed cross-sectional view taken on the line 10—10 of Figure 4 and showing portions of the cooperating stroke adjusting cams.

As illustrated in Figures 4, 5, 8 and 9 (Figure 8 being a vertical cross section on line 8—8 of Figure 4), the outer end portion of the cam member 67 is enlarged and has a radially extending well 75 formed therein and opening upon the periphery thereof. Said well 75 has slidably mounted therein a plunger-like key 76 which is normally pressed outwardly by a metal expansion spring 77 which is positioned in said well 75 as illustrated in Figures 4 and 8. An annular metal ring 78, preferably having its periphery 79 formed to extend axially or substantially perpendicularly to the main portion of said ring, is mounted about the central portion of the cam member 67 and is secured by a key 80 against the outer face of the radial flange on the cam member 69, as shown in cross section in Figure 4. Said ring 78 has in its outer marginal portion an annular series of equidistantly spaced recesses 81, said recesses being preferably of rectangular form and of such shape as to receive the upper end portion of the slidably mounted key 76. The outer periphery of the enlarged outer end portion of the cam member 67 preferably has formed thereon a plurality of uniformly spaced apart indicia as indicated in Figure 9, in which view the said indicia are indicated as fractions and which are so spaced as to indicate the degree to which the vertical limits of movement of the connecting rod and connected reciprocating ram or plunger are moved from dead center.

I desire it to be understood that when the operator desires either to lengthen or shorten the stroke of the slidably mounted tool-holding ram or plunger, he will first release the lock nut 35, preferably partially unthread and release the cone-shaped nut 70, and then depress the key 76 against the action of spring 77 to disengage said key from its position in one of the recesses 81, and then rotate the ring 78 and connected cam member 69 to the desired degree. In such adjusting movement the operator may be guided by the indicia or marks upon the outer periphery of the enlarged outer end of the cam member 67. As eccentric cam member 69 is secured by key 80 to ring 78, the former will rotate with said ring. When the said cam member 69 has been positioned relatively to cam member 67 as desired, the key 76 is allowed to reseat itself into the adjacent recess 81 and the operator will then tighten the cone-shaped nut 70 and thence the lock nut 35. The cam member 67 is keyed to shaft 31 as previously stated. As shown in Figure 4, the cone-shaped nut 70 is surrounded by a bushing having a reversely tapered inner periphery for receiving the tapered outer periphery of the nut. Such bushing fits rotatably in a cylindrical aperture in the upper end of the connecting rod 72 and is clamped by the nut 70 against the radially extending flange on the inner end of the cam member 69. It has at its small end an outwardly extending radial flange which coacts with the outer marginal portion of said flange on the inner end of the cam member 69 to hold the upper end of the connecting rod 72 against axial displacement with respect to the two cam members 67 and 69. When the shaft 31 is driven the aforementioned bushing that surrounds the cone-shaped nut 70 operates as a crank for the connecting rod due to the fact that it is maintained in an eccentric position relatively to the shaft by the cam members 67 and 69.

Figure 7:
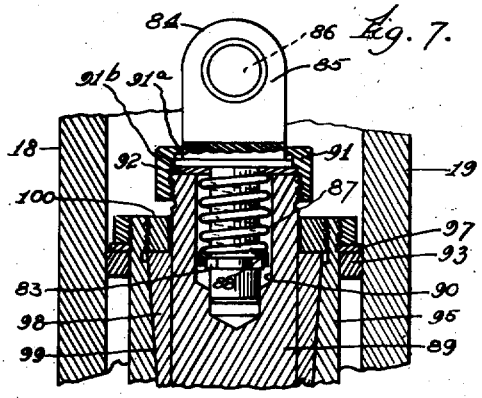
Figure 7 is a detailed sectional view of the connection between the connecting rod and the reciprocable plunger type ram, showing the shock absorbing and cushioning means.

A shackle 84 having an upper apertured bifurcated end 85 and a depending stud is removably connected to the connecting rod 72 by a suitable wrist pin 86 which extends through the apertures in the end 85 and through an aligned hole in the lower end of said connecting rod. As illustrated in Figures 4 and 7, the downwardly extending stud of said shackle 84 is reduced and has mounted thereabout an expansion spring 87, the lower end of which rests upon a downwardly flanged washer 88. The latter in turn rests upon a sectional washer, the sections of which fit within a groove in the lower end of the stud, as illustrated in Figure 7.

The cylindrical ram or plunger 89 of the machine has an upper end opening or socket 90 therein and its upper end is externally threaded as indicated. The depending spring-surrounded stud of the yoke 84 fits in said socket 90. Said ram 89 is removably connected to the yoke 84 by a bushing nut 91 which threads upon the upper threaded end of the ram 89 and has an inwardly extending flange portion 91—*a* overlying the intermediate annular flange of the shackle 84. The bushing nut 91 is secured in such position that a space or clearance is provided between the annular flange of said yoke 84 and the inwardly extending flange portion 91—*a* of said bushing nut 91, as illustrated in Figure 7. Because of such space or clearance the yoke is permitted to move to a limited extent relatively to the ram.

Interposed between the annular intermediate flange of the yoke 84 and the upper end face of the ram 89, is a suitable washer 92 whose outer periphery is impinged between an annular downwardly facing shoulder 91—*b* on the bushing nut 91 and said upper end face of said ram 89. The annular flange of yoke 84 is disposed within the area defined by shoulder 91—*b*, as shown in Figure 7, so that it is free to slide to a limited extent relatively to the nut 91. As shown in Figure 7, the upper end of the spring 86 abuts against the inner periphery of the washer 92. The spring urges the annular flange of the yoke into engagement with the washer 92 and forms with the washer a resilient connection between the yoke and the ram. Such connection, due to the inherent resiliency of the spring, serves to absorb shock during each up stroke of the ram. During down stroke of the ram the yoke flange abuts against the washer 92 and hence the ram is positively forced downwards by the connecting rod. Because of the specific construction and arrangement of the parts constituting the connection between the upper end of the ram and the lower end of the connecting rod the ram may be turned or rotated relatively to the yoke. By reason of the fact that the washer 92 is rigidly connected to the upper end of the ram and has the upper portion thereof in frictional engagement with the annular flange of the yoke and its lower portion in frictional engagement with the upper end of the spring the ram tends to remain in the various positions into which it is rotatively adjusted even while it is subject to reciprocation by the connecting rod in connection with drive of the shaft 31.

The ram 89 is mounted with respect to the depending standards 19 and 18 in the following manner. Secured in vertically spaced apart planes, by welding, by screws or the like, on the inner faces of standards 18 and 19 and the inner face of the connecting member 20 of the frame 17 are upper and lower rings 93 and 94. A cylindrical metal turret 95 which has a downwardly tapered inner surface is threaded at its upper end both internally and externally, as shown in Figures 4 and 7. A thrust collar 95—*a* is threaded upon the externally threaded upper end of the cylindrical turret 35, overlies the ring 93, and coacts with the latter to prevent downward displacement of the turret. The turret 95 has an annular flange 96 near its lower end which engages the lower surface of the lower ring 94 and coacts therewith to prevent upward displacement of the turret with respect to the frame 17. Said turret is rotatably mounted in said rings 93 and 94 and is locked in place by tightening the collar 95—*a* which normally bears against a washer 97 on the upper ring 93, as illustrated in Figure 4.

A metal longitudinally split sleeve 98 having a downwardly tapered exterior surface 99 is mounted so that its exterior surface engages the downwardly tapered inner surface of the turret 95. Said sleeve is shorter than the opening within the turret 95 and is normally held locked in position by an externally threaded ring 100 which is in screw threaded engagement with the internal screw thread at the upper end of the turret 95. Downward adjustment of the ring 100 will move the bearing sleeve 98 downward to take up from time to time such wear as takes place on the slidable faces of the ram and sleeve. It will be understood that by downward movement of said sleeve 98, the ram can be maintained at the proper degree of tightness and slidable engagement to prevent undesirable vibration and noise.

A centrally apertured bushing member 102 of substantially cylindrical cup-like shape is secured rotatably on the lower end of turret 95 by means of a split annular key 103 which is seated in opposed annular grooves formed in the lower end of the turret 95 and in the upper flanged portion of bushing member 102. The lower portion of bushing member 102 defines an annular bearing surface which slidably engages the reciprocable ram 89.

A hand wheel 104, which is preferably knurled, on its outer periphery, is secured around the lower end of the bushing member 102 in a plane perpendicular to the longitudinal axis of the ram 89. The outermost peripheral portion of said hand wheel 104 is of a dimension sufficient to form a convenient gripping element and is connected to the bushing member 102 by a relatively thinner wall which has a pair of diametrically opposite apertures 105 therein. It will be understood that said hand wheel provides means whereby the bushing member may be gripped in connection with turning thereof.

I provide means for releasably locking said bushing member 102 in any one of a plurality of positions, this for the purpose of selectively positioning the hereinafter described stripper with respect to the reciprocating tool and with respect to the sheet being worked upon. As shown in Figures 4, 11 and 12, the upper portion of said bushing member 102 is provided with a plurality of spaced apart recesses 106 which extend radially or open outwardly and are positioned in the same horizontal plane. A spring pressed plunger 107 having an exposed convenient hand knob at the outer end and its inner end reduced to form a slidable and retractable stud, is slidably mounted in a transversely extending internally threaded passage 109 formed in the lower end of the side member 19 of the frame 17. Said plunger 107 has its stud or inner end slidably mounted in an externally threaded bushing 110 which fits within the internally threaded passage 109. A metal expansion spring 111 is mounted about the inner stud end of the plunger 107 and its inner one end normally presses against a thrust collar 112 which is secured by welding or the like on the inner extremity of the plunger 107. The opposite or other end of said spring 109 abuts against the inner end of the bushing 110 with the result that the spring exerts spring pressure to hold said plunger projected inwardly and seated in one of the recesses 106 in the upper end of the bushing member 102. It will be apparent that the operator may adjust said bushing member by rotation and the hereinafter described stripper means to any one of a number of desired positions to cause a more efficient operation and hold-down functioning of the stripper.

Two laterally spaced vertically extending studs or bolts 113 have their upper ends securely mounted in the apertures 105 respectively, preferably by means of suitable nuts threaded thereon as illustrated in Figure 4. Each of said bolts 113 has a pair of nuts 114 threaded thereon in spaced apart and selectively adjustable positions. A metal substantially U or yoke-shaped stripper 115 having a centrally disposed vertically extending open sided tool receiving portion 116 has a tubular part at the upper end of the one arm thereof and this part is slidably, adjustably and removably mounted on one of the bolts 113 between the two adjusting nuts 114 thereon, said nuts being positionable at various heights so as releasably and hingedly to mount the adjacent arm of said stripper at the desired height to accord with the particular work.

The upper end of the other or opposite arm of the stripper 115 has an integral part 117 of semi-circular cross section and this fits normally between the two nuts on the other bolt, as shown in Figure 4. Said part 117 is adapted to be mounted at the desired height similarly to the portion 116 so as to aid in mounting the stripper 115 at the desired height. Where, in some operations, particularly in changing from one thickness of work sheet to another, it is desirable to move the stripper away from the shearing or punching tool, I have provided adjustable pivotal means so that the stripper need not be entirely removed from the machine, but instead the two nuts on the opposite faces of the part 117 may be rotated and released by the operator relatively quickly, and then the stripper may be pivoted or swung in a horizontal plane entirely away from the reciprocating tool and from the clamping means directly holding the tool. It will also be apparent that this construction permits the average operator by vertical adjustment of the nuts 114 to adjust the height of the stripper to adapt the machine for use in connection with work pieces or sheets that vary in thickness.

The central tool receiving passage 116 in the stripper is preferably defined by opposite inwardly facing conical faces so that the central portion of the stripper may be positioned relatively close to the subjacent portion of the metal sheet.

As illustrated in Figures 4 and 6, the lower end of the ram 89 has a transverse bolt receiving passage and has removably mounted thereon a tool holder 119 by means of a suitable releasable bolt 120 which extends through the passage. The tool holder has its lower end reduced and externally threaded as shown and has a longitudinally extending and downwardly opening passage therein which over a substantial area thereof is downwardly flared. A longitudinally slit or split collet 121 is removably mounted in the longitudinal passage of the tool holder 119, and is normally held therein by a nut 122 which is in screw threaded engagement with the external screw thread at the lower end of the tool holder 119. A shearing, nibbling, punching or like tool may be applied to the holder by inserting the shank thereof into the collet and then tightening the nut 122. Figure 6 shows a nibbling type tool in connected relation with the holder at the lower end of the ram.

Mounted on the shelf or base 15 which overlies the supporting brackets 14 is a mounting block 124 which has an internally threaded upper opening in which is mounted a die 125. The latter has a central opening of such form as to receive the working or lower end of the particular tool in the collet 121 to perform the desired operation. The die 125 is adapted to be securely and removably mounted in mounting block 124 by a suitable externally threaded bushing 126 whose inner flanged portion grips said die in a conventional manner.

In shearing operations, a suitable blade-bearing unit having a shearing edge and of conventional type is substituted for die 126, and in punching operations suitable male and female dies are mounted in their respective conventional positions.

As illustrated in Figures 1 and 3, the preferred form of driving means comprises an electric motor 128 which is mounted on the outer end of the upper arm of the C-shaped frame 10 and is arranged so that the armature shaft thereof is in parallel relation with the shaft 31. A pair of concentric adjacent grooved pulleys 129, or a cone pulley, is secured upon the armature shaft of motor 128. Motor 128 is preferably, though not necessarily, secured by bolts or the like to an adjustably mounted base 130 which is pivotally mounted at one side edge thereof by pins or bolts 131. The latter extend into the upper arm 10—*b* of frame 10. Said pivotal mounting of the base and of the motor connected thereto is such that the free unsecured end portion of the pivoted base 130 extends in the direction of the head or frame 17 and the aforedescribed reciprocating mechanism. An apertured cam 132 is mounted for pivotal movement upon the side face of the cam 10—*b* by means of a suitable bolt or screw, as illustrated in Figure 1, said cam having a handle 133 to provide for conventient rotation of said eccentric cam 132 to thereby raise or lower the platform or base 130 and adjust the tightness of the transmission belt. Either of the pulleys 129 is drivingly connected to the correspondingly aligned pulley on shaft 31, in other words, either to pulley 64 or pulley 65, by said transmission belt.

It is known that in machines wherein the driving motor is mounted so that the axis thereof extends longitudinally of the main frame, especially in long-throated frames of the type herein illustrated, motor rotation and the pushes and pulls incident to the transmission of power set up a vibration of the upper portion of the frame above the throat which likewise vibrates the head in directions transverse or crosswise of the machine and of the upper arm of the machine frame, reciprocating mechanism and all connected parts which hold and reciprocate the punching or other tool. Such usual transverse vibration is undesirable in that the tool is correspondingly moved and also because the vibratory movement is imparted through the friction of the tool to the metal sheet being worked upon.

My provision of a mounting of the head with reciprocating ram, of the power transmission means and mechanism, and also of the motor in such a manner that the stroke and pull of the power is lengthwise of the frame and parallel to the longitudinal axis of the frame, substantially eliminates vibration of the upper frame arm, of the head, and of the parts mounted thereon, this being because the pushing and pulling stresses are in the same direction as the stronger and rigid longitudinal parts of the frame which in such direction are sufficient in strength to prevent any noticeable vibrating during normal operation.

The herein described metal working machine is essentially simple in design and is characterized by high efficiency and facility of adjustment. It may be produced at a comparatively low cost and possesses many inherent advantages over previously designed machines for the same general purpose.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof."

Having thus described the invention what I claim as new and desire to secure by Letters Patent is:

1. In a machine for shearing or punching sheet metal or the like, and having a throated frame; a head frame mounted on the throated frame and provided with a spaced apart side portions; a horizontal rotatable power driven shaft; cam-mounted bearing members for the shaft and having the cams therefor rotatably mounted in the side portions of said head frame;

manually operable clutch mechanism operatively connected to said cams and adapted conjointly to rotate the latter in order to adjust the height of said shaft; a connecting rod; a crank-type connection between said connecting rod and shaft whereby said rod will be reciprocated in response to drive of the shaft; a reciprocable ram connected to said connecting rod; bearing means in which said ram is slidably mounted; and tool holding means on said ram.

2. In a machine for shearing or punching sheet metal or the like; a frame-like head provided with spaced apart side portions; a horizontal rotatable power shaft; cam-mounted bearing members arranged rotatably to support the shaft and having the cams thereof rotatably mounted in the side portions of said head; manually operable clutch mechanism operatively connected to said cams and adapted conjointly to rotate the latter in order to adjust the height of said shaft; a connecting rod; adjustable inner and outer cooperating crank-type cams forming combined bearing and drive means between said connecting rod and said shaft; a slidably mounted ram connected to said connecting rod; tool holding means on said ram; and releasable locking means for locking said outer crank-type cam against rotation with respect to the inner crank-type cam.

3. In a punching and shearing machine having a horizontally throated frame; a frame-like head mounted on the throated frame; a horizontal power driven shaft journalled in said head; a slidably mounted vertically reciprocable plunger having a connecting rod therefor journalled eccentrically on said shaft whereby rotation of said shaft causes reciprocation of said plunger; a vertical turret on said head having an adjustable bearing member in which said plunger is slidably mounted and provided with a rotatable part at its lower end; manually retractable mechanism for releasably locking said rotatable turret part in desired position; a yoke-like stripper depending from and connected to said turret part and adjustably mounted for vertical movement whereby said stripper may be selectively mounted at the desired height in relation to the work; and means on the lower end of said plunger for clamping a cutting or shearing tool therein.

4. In a machine of the described class having a throated frame and a head; a horizontal driven shaft journalled in said head; a vertical ram beneath the shaft; a vertical bearing member in which said ram is slidably mounted; adjustable cam-crank type bearings on said shaft and a connecting rod connecting the upper end of said ram and said bearings whereby rotation of said shaft reciprocates said ram vertically; a rotatable hand wheel adjacent the lower end of said ram bearing member; a substantially U-shaped stripper having a recess in its lower end within which a tool connected to the lower end of said ram is reciprocated; and a pair of vertically extending externally threaded posts connected to and depending from said hand wheel and having adjustable securing members thereon for adjustably and releasably mounting said stripper on said posts and whereby said stripper may be selectively secured at the desired height.

5. In a machine of the described class having a throated frame and a head; a horizontal power driven shaft journalled in said head; a reciprocating ram beneath the shaft; adjustable cam and crank type bearings on said shaft and a connecting rod connecting the upper end of said ram and said bearings whereby rotation of said shaft reciprocates said ram vertically; a turret mounted on said head and having a part at its lower end adapted to be rotated in a horizontal direction; an adjustable bearing member in said turret for slidably mounting the ram; means for selectively securing the turret part against rotation and in varied positions; a hand wheel on the lower end of said turret part; a substantially U-shaped stripper having a recess in its lower end within which a tool connected to the lower end of said ram is reciprocated; and a pair of vertically extending externally threaded posts connected to and depending from said hand wheel and having adjustable securing means thereon for adjustably and releasably mounting said stripper on said posts and whereby said stripper may be selectively secured at the desired height.

6. In a shearing, punching and cutting machine having a journalled power driven horizontal shaft; a depending connecting rod eccentrically journalled on said shaft; a suspended head frame; a turret mounted in said head frame and disposed beneath the shaft; an adjustable bearing member mounted in said turret; a ram slidably mounted in said bearing member, said adjustable bearing member being adapted to be adjusted to take up the wear between said ram and said turret; spring-pressed releasable connection means connecting the upper end of said ram and the lower end of said connecting rod whereby said ram may be manually rotatively adjusted and will normally remain in the position in which it has been adjusted; and means secured on the lower end of said ram for locking a tool therein.

7. In a shearing, punching and cutting machine having a throated frame and having a power driven horizontal shaft and a depending connecting rod eccentrically journalled on said shaft; a vertically reciprocable ram beneath the connecting rod and having an open top socket in its upper end; a pair of depending spaced apart side members at opposite sides of the ram; a cylindrical bearing member mounted between and on said depending side members and having a cone-shaped inner surface; an adjustable bearing sleeve in said cylindrical bearing member having a complemental cone-shaped outer surface and forming a slidable bearing for said ram; a yoke element having its upper end pivotally connected to said connecting rod and embodying a depending stud portion in said socket; a bushing nut about said yoke element and threaded on the upper end of said ram; a compression spring extending around the stud, said spring, yoke and bushing nut forming a yieldable connection between said ram and said connecting rod to cushion the upward strokes of said ram; adjustable means secured on the lower end of said ram for releasably locking a tool therein; a rotatable wheel adjacent the lower end of said cylindrical bearing member; and a yoke-shaped stripper adjustably mounted on and disposed below said wheel.

8. In a shearing, punching and cutting machine having a throated frame; a head mounted on one of the arms of the frame and embodying spaced apart side portions; rotatable eccentric bearing members in said side portions of the head; a horizontal power driven shaft journalled in said bearing members, said rotatable bearing members providing for vertical adjustment and positioning of said shaft; a depending connecting rod eccentrically journalled on said shaft; a vertically reciprocable ram beneath the connecting rod; a bearing member in which said ram is slidably mounted; spring-pressed connecting means connecting the upper end of said ram and the lower end of said connecting rod whereby upward and downward thrusts are transmitted from said connecting rod to said ram; and means on the lower end of said ram for locking a tool therein.

9. In a shearing, punching and cutting machine having a throated frame; a head mounted on the frame and embodying spaced apart side portions; horizontally aligned rotatable eccentric bearing means in said side portions of the head, respectively; a horizontal shaft journalled in said bearing members, said rotatable bearing members providing for vertical adjustment and positioning of said shaft; a depending connecting rod eccentrically journalled on said shaft; a vertically reciprocable ram disposed beneath, and having its upper end operatively connected to, the connecting rod; a bearing member in which said ram is slidably mounted; means on the lower end of said ram for releasably locking a tool therein; and a manually operable clutch mechanism opertively connected to said rotatable eccentric bearing members and adapted when operated, to rotate and to secure said bearing members to position said shaft at varied heights to regulate the vertical position of the strokes of said reciprocable ram.

10. In a shearing, punching and cutting machine having a throated frame; a head mounted on the frame and embodying spaced apart side portions; horizontally aligned rotatable eccentric bearing members in said side portions of the head; a horizontal shaft journalled in said bearing members, said rotatable bearing members providing for vertical adjustment and positioning of said shaft; a depending connecting rod; rotatively adjustable cam and crank type bearings on the shaft forming an operative connection between said shaft and said connecting rod whereby the stroke imparted to said connecting rod may be varied; a reciprocable ram disposed beneath, and having its upper end connected to, the connecting rod; a bearing member in which said ram is slidably mounted; means on the lower end of said ram for releasably locking a tool therein; and a manually operable clutch mechanism operatively connected to said rotatable eccentric bearing members and adapted, when operated, to rotate and to secure said bearing members to position said shaft at varied heights to regulate the vertical position of the strokes of said reciprocable ram.

11. In a shearing, punching and cutting machine having a throated frame; a head on the frame; horizontally aligned rotatable eccentric bearing members in said head; a horizontal power driven shaft journalled in said bearing members, said rotatable bearing members providing for vertical adjustment and positioning of said shaft; a depending connecting rod; a vertically reciprocable ram disposed beneath, and having its upper end operatively connected to, the connecting rod; a bearing member in which said ram is slidably mounted; means on the lower end of said ram for releasably locking a tool therein; a manually operable clutch mechanism operatively connected to said rotatable eccentric bearing members and adapted, when operated, to rotate and to secure said bearing members to position said shaft at varied heights to regulate the vertical position of the strokes of said reciprocable ram; and a pivotal stripper operatively, removably and adjustably connected to said ram bearing member and adapted to engage and hold down a metal sheet or the like during cutting operations.

12. In a shearing, punching and cutting machine having a throated frame; a head on the frame; horizontally rotatable eccentric bearing members in said head; a horizontal power driven shaft journalled in said bearing members, said rotatable bearing members providing for vertical adjustment and positioning of said shaft; a depending connecting rod eccentrically journalled on said shaft; a vertically reciprocable ram disposed beneath, and having its upper end operatively connected to, said connecting rod; a bearing member in which said ram is slidably mounted; means on the lower end of said ram for releasably locking a tool therein; and a pivotal stripper operatively, removably and adjustably connected to said ram bearing member and adapted to selectively engage and hold down a metal sheet or the like during cutting operations.

13. In a shearing, punching and cutting machine having a throated frame; a head mounted on the frame and including a pair of spaced apart depending side members; a drivable horizontal shaft; a pair of longitudinally aligned eccentric cam bearings mounted in the head side members for rotative adjustment and forming a journal for said shaft, the adjustable rotation of said eccentric cam bearings being adapted to raise or lower said shaft in said head with respect to the work and frame; a depending connecting rod eccentrically journalled on said shaft; manually adjustable cam means between said connecting rod and said shaft and providing for changes of length of stroke imparted to said connecting rod; a vertically reciprocable ram having pivotal connection with said connecting rod; a rotatable turret supported in said head and having a bearing surface in which said ram is slidably mounted; adjustable means secured on the lower end of said ram for releasably locking a tool therein; and releasable locking means for locking said turret in varying positions.

14. In a shearing and punching machine having a supported throated frame with an elongated integral horizontally extending upper frame arm; a head including depending spaced apart mounting standards secured on the forward end of said upper frame arm; a horizontal drive shaft journalled in said standards and extending in a direction transverse with respect to the longitudinal center of said upper frame arm; a depending connecting rod; coacting rotatably adjustable inner and outer cams mounted on the shaft and forming combined bearing and crank means between said shaft and the upper end of the connecting rod; a vertically reciprocable ram beneath the rod slidably mounted in said head and having its upper end operatively connected to the lower end of said connecting rod; a tool-holding means on the lower end of said ram; and a power transmission pulley mounted on one end of said shaft and adapted to be belt-driven from a motor that is mounted on said upper frame arm so that its armature shaft is parallel to said drive shaft.

15. A machine for punching, cutting or shearing sheet metal or the like comprising in combination a frame; a head mounted on the frame and embodying a pair of spaced apart side parts with horizontally aligned apertures therein; a pair of circular members mounted rotatably in said apertures, respectively, and having horizontally aligned eccentrically disposed bearings therein; a horizontal power driven shaft journalled in the bearings, provided with crank means, and adapted to have its horizontal position changed in response to rotation of the members; a depending connecting rod having its upper end operatively connected to said crank means; a vertically slidable ram beneath the connecting rod having its upper end operatively connected to the lower end of said rod and provided at its lower end with tool holding means; means for connecting the members for conjoint rotation; and releasable means for retaining said members in the various positions into which they are rotated.

16. A machine for punching, cutting or shearing sheet metal or the like, comprising in combination a C-shaped frame; a head mounted on the outer end of the upper arm of the frame and embodying a pair of spaced apart upstanding side parts with circular horizontally aligned apertures therein; a pair of circular members mounted rotatably in said apertures, respectively, and having horizontally aligned eccentrically disposed bearings therein; a horizontal power driven shaft having the ends thereof journalled in the bearings, provided on its central portion and between the side parts of the frame with crank means, and adapted to have its horizontal position changed in response to rotation of the members; a depending connecting rod having its upper end operatively connected to said crank means; a vertically slidable ram beneath the connecting rod having its upper end operatively connected to the lower end of said rod and provided at its lower end with tool holding means; means for connecting the members for conjoint rotation; and readily releasable means between one of the members and its associated frame side part for locking the members in the various positions into which they are rotated.

17. A machine adapted to punch, cut or shear sheet metal or the like and comprising a C-shaped frame; a head mounted on the outer end of the upper arm of the frame and embodying a pair of spaced apart upstanding side parts with circular horizontally aligned apertures therein; a pair of circular members mounted rotatably in said apertures, respectively, and having horizontally aligned eccentrically disposed bearings therein; a horizontal power driven shaft having the ends thereof journalled in the bearings, provided on its central portion and between the side parts of the frame with crank means, and adapted to have its horizontal position changed in response to rotation of the members; a depending connecting rod having its upper end operatively connected to said crank means; a vertically slidable ram beneath the connecting rod having its upper end operatively connected to the lower end of said rod and provided at its lower end with tool holding means; means for connecting the members for conjoint rotation; a lever type handle disposed outwards of, and along one of the side parts of, the head, and arranged and adapted in response to swinging thereof to rotate the members; and releasable means controllable from the distal end of the handle for locking said members in the various positions into which they are rotated.

18. A machine adapted to punch, cut or shear sheet metal or the like and comprising a frame; a head mounted on the frame; a horizontal power driven shaft journalled on the head; inner and outer coacting relatively rotatively adjustable circular members mounted around the shaft and forming crank means, the inner member being eccentrically mounted with respect to the shaft and the outer member having an eccentrically positioned circular aperture in which the inner member fits; releasable means for locking the two members against relative rotation; a depending connecting rod having its upper end journalled around the outer member so that it is operatively connected to said crank means, and adapted to have the magnitude of its stroke varied in response to relative rotative adjustment of the two members; and a vertically slidable plunger type ram beneath the connecting rod having its upper end operatively connected to the lower end of said rod and provided at its lower end with tool holding means.

19. A machine adapted to punch, cut or shear sheet metal or the like and comprising a C-shaped frame; a head mounted on the outer end of the upper arm of the frame; a horizontal power driven shaft extending through and journalled in the head; an inner circular member fixedly mounted on, and positioned eccentrically to, the shaft, and a coacting outer circular member having an eccentrically positioned circular aperture in which the inner member fits, rotatable relatively to said inner member and forming therewith an adjustable crank; releasable means for locking the outer member against rotation relatively to the inner member; a depending connecting rod having its upper end journalled around the outer member so that it is operatively connected to said crank, and adapted to have the length of its stroke varied in response to rotative adjustment of the outer member with respect to the inner member; and a vertically slidable plunger type ram beneath the connecting rod, having its upper end operatively connected to the lower end of said rod and provided at its lower end with tool holding means.

20. A machine adapted to punch, cut or shear sheet metal or the like and comprising a C-shaped frame; a head mounted on the outer end of the upper arm of the frame and embodying a pair of spaced apart side parts; a horizontal power driven shaft having the ends thereof extending through and journalled in said side parts of the head; an inner circular member mounted fixedly around the central portion of the shaft and positioned eccentrically with respect to said shaft, and an outer coacting circular member having an eccentrically positioned circular aperture in which the inner member fits, rotatable relatively to said inner member and forming with said inner member an adjustable crank; releasable means surrounding said central portion of the shaft for locking the outer member against rotation relatively to the inner member; a depending connecting rod having its upper end journalled around the outer member so that it is operatively connected to said crank, and adapted to have the length of its stroke varied in response to rotative adjustment of the outer member with respect to the inner member; and a vertically slidable plunger type ram beneath the connecting rod, having its upper end operatively connected to the lower end of said rod and provided at its lower end with tool holding means.

21. A machine adapted to punch, cut or shear sheet metal or the like and comprising a frame; a head mounted on the frame; a horizontal power driven shaft journalled on the head and provided with means whereby it may be vertically adjusted; inner and outer coacting relatively rotatively adjustable circular members mounted around the shaft and forming crank means, the inn r member being eccentrically mounted with respect to the shaft and the outer member having an eccentrically positioned circular aperture in which the inner member fits; releasable means for locking the two members against relative rotation; a depending connecting rod having its upper end journalled around the outer member so that it is operatively connected to said crank means, and adapted to have the magnitude of its stroke varied in response to relative rotative adjustment of the two members; and a vertically slidable plunger type ram beneath the connecting rod having its upper end operatively connected to the lower end of said rod and provided at its lower end with tool holding means.

22. A machine adapted to punch, cut or shear sheet metal or the like and comprising a C-shaped frame; a head mounted on the outer end of the upper arm of the frame and embodying a pair of spaced apart side parts with horizontally aligned apertures therein; a pair of circular members mounted rotatably in said apertures, respectively, and having horizontally aligned eccentrically disposed bearings therein; a horizontal power driven shaft having the ends thereof journalled in the bearings, and adapted to have its horizontal position changed in response to rotation of the members; inner and outer coacting relatively rotatively adjustable crank type elements mounted around the central portion of the shaft and forming an adjustable crank, the inner element being eccentrically mounted with respect to the shaft and the outer element having an eccentrically positioned circular aperture in which the inner element fits; releasable means for locking the two elements against relative rotation; a depending connecting rod having its upper end journalled around the outer element so that it is operatively connected to said crank and adapted to have the magnitude of its stroke varied in response to varied rotative adjustment of the two elements; a vertically slidable plunger type ram beneath the connecting rod having its upper end operatively connected to the lower end of the rod and provided at its lower end with tool holding means; means for connecting the aforementioned members for conjoint rotation; and releasable means for retaining the members in the various positions into which they are rotated.

23. A machine adapted to punch, cut or shear sheet metal or the like and comprising a frame; a head mounted on the frame; a horizontal power driven shaft journalled on the head and provided with crank means; a depending connecting rod having its upper end operatively connected to said crank means; a vertically slidable plunger type ram positioned beneath the connecting rod and provided at its lower end with tool holding means; and a spring loaded driving connection between the upper end of the ram and the lower end of the rod, arranged and designed so that the ram is positively slid downwards during the down stroke of the connecting rod and is slid upwards with a yielding thrust during up stroke of said connecting rod.

24. A machine for punching, cutting or shearing sheet metal or the like, and comprising in combination a frame; a head mounted on the frame, a horizontal power driven shaft journalled on the head and provided with crank means; a depending connecting rod having its upper end operatively connected to said crank means; a vertically slidable plunger type ram beneath the connecting rod provided with a longitudinal open top socket at its upper end and having tool holding means at its lower end; and a spring loaded driving connection between the upper end of the ram and the lower end of the rod, arranged and designed so that the ram is positively slid downwards during the down stroke of the connecting rod and is slid upwards with a yielding thrust during up stroke of said connecting rod, and comprising a vertically extending link type element having its upper end pivotally connected to the lower end of the connecting rod and its lower end in the form of a stud and disposed in the socket, a bushing nut extending around the central portion of said element and screw threaded on the upper end of the ram, and a compression spring extending around said stud.

25. A machine adapted to punch, cut or shear sheet metal or the like and comprising a frame; a head mounted on the frame; a horizontal power driven shaft journalled in the head and provided with crank means; a depending connecting rod having its upper end operatively connected to said crank means; a vertically extending cylindrical bearing member beneath the connecting rod; a plunger type ram mounted slidably in the bearing member and having its upper end operatively connected to the lower end of the connecting rod and its lower end provided with tool holding means; a horizontally positioned hand wheel mounted rotatably adjacent the lower end of the bearing member and provided with a pair of diametrically opposite depending externally threaded posts; a U-shaped stripper beneath the hand wheel provided in the central portion thereof with an open sided tool receiving recess and having at the upper end of one of its side portions a tubular part of circular cross section extending around one of the posts and at the upper end of its other side portion a part of semi-circular cross section adapted to fit around the other post, and upper and lower nuts mounted on the posts in straddled relation with said parts and adapted when turned relatively to the posts vertically to adjust the stripper and when released from clamped relation with said parts to permit the stripper to be swung laterally about said one post.

26. In a machine for shearing or punching sheet metal or the like, and having a throated frame; a head frame mounted on the throated frame and provided with spaced apart side portions; a horizontal rotatable power driven shaft; cam-mounted bearing members for the shaft and having the cams therefor rotatably mounted in the side portions of said head frame; manually operable clutch mechanism operatively connected to said cams and adapted conjointly to rotate the latter in order to adjust the height of said shaft; a connecting rod; a crank-type connection between said connecting rod and shaft whereby said rod will be reciprocated in response to drive of the shaft; a reciprocable ram disposed beneath the connecting rod and having the upper end thereof pivotally connected to the lower end of said rod; adjustable bearing means in which said ram is slidably mounted; and releasable tool holding means on said ram.

27. In a machine for shearing or punching sheet metal or the like, and having a throated frame; a head frame mounted on the throated frame and provided with spaced apart side portions; a horizontal rotatable power driven shaft;

cam-mounted bearing members for the shaft and having the cams therefor rotatably mounted in the side portions of said head frame; manually operable clutch mechanism operatively connected to said cams and adapted conjointly to rotate the latter in order to adjust the height of said shaft; a connecting rod; relatively adjustable crank-type cams connecting said connecting rod and shaft whereby said rod will be reciprocated in response to drive of the shaft; a reciprocable ram connected to said connecting rod; bearing means in which said ram is slidably mounted; and tool holding means on said ram.

JOHN OPIE.